US009682772B2

(12) United States Patent
Yoon

(10) Patent No.: US 9,682,772 B2
(45) Date of Patent: Jun. 20, 2017

(54) MULTI-STAGE TILTING AND MULTI-ROTOR FLYING CAR

(71) Applicant: EXENS, Seoul (KR)

(72) Inventor: Kwang Joon Yoon, Seoul (KR)

(73) Assignee: EXENS, Seoul (KR)

( * ) Notice: Subject to any disclaimer, the term of this patent is extended or adjusted under 35 U.S.C. 154(b) by 79 days.

(21) Appl. No.: 14/647,444

(22) PCT Filed: Feb. 25, 2013

(86) PCT No.: PCT/KR2013/001483
§ 371 (c)(1),
(2) Date: May 26, 2015

(87) PCT Pub. No.: WO2014/081082
PCT Pub. Date: May 30, 2014

(65) Prior Publication Data
US 2015/0298800 A1    Oct. 22, 2015

(30) Foreign Application Priority Data

Nov. 26, 2012    (KR) .......................... 10-2012-0134690

(51) Int. Cl.
*B64C 27/26*        (2006.01)
*B60F 5/02*         (2006.01)
(Continued)

(52) U.S. Cl.
CPC .............. *B64C 27/26* (2013.01); *B60F 5/003* (2013.01); *B60F 5/02* (2013.01); *B64C 27/20* (2013.01);
(Continued)

(58) Field of Classification Search
CPC ......... B64C 27/26; B64C 27/20; B64C 27/28; B64C 29/0025; B64C 29/0033
See application file for complete search history.

(56) References Cited

U.S. PATENT DOCUMENTS 5,505,407 A * 4/1996 chiappetta ........... B64C 29/0025
244/12.5
5,746,390 A * 5/1998 Chiappetta .............. B64C 37/00
244/12.2
(Continued)

FOREIGN PATENT DOCUMENTS

KR    10-2010-0043660 A    4/2010

*Primary Examiner* — Justin Benedik
(74) *Attorney, Agent, or Firm* — Rabin & Berdo, P.C.

(57) ABSTRACT

The present invention provides a multi-stage tilting and multi-rotor flying car including: a main frame externally shaped like a rectangle and internally partitioned to have a grid structure; a body mounted at a center of the main frame in consideration of balance; a plurality of rotors mounted to the main frame to face upward; a plurality of wheels mounted to the main frame to face downward; body wings provided at opposite sides of the body; and an automatic driving controller provided in the body and controlling the rotors and the wheels, thereby having effects on spending only the minimum necessary flying time for taking off and landing in a narrow area, and improving flight performance three times higher in flight time and flight speed and five times higher in fight distance than a rotary-wing aircraft such as a helicopter while flying in the fixed-wing mode.

20 Claims, 7 Drawing Sheets

(51) Int. Cl.
  *B64C 29/00* (2006.01)
  *B64C 37/00* (2006.01)
  *B60F 5/00* (2006.01)
  *B64C 27/28* (2006.01)
  *B64C 27/20* (2006.01)

(52) U.S. Cl.
  CPC .......... *B64C 27/28* (2013.01); *B64C 29/0025* (2013.01); *B64C 29/0033* (2013.01); *B64C 37/00* (2013.01)

(56) References Cited

U.S. PATENT DOCUMENTS

| | | | | |
|---|---|---|---|---|
| 6,568,630 B2* | 5/2003 | Yoeli | ................... | B64C 11/001 244/12.3 |
| 6,886,776 B2* | 5/2005 | Wagner | ................... | B64C 3/56 244/12.1 |
| 7,159,817 B2* | 1/2007 | VanderMey | ........ | B64C 29/0016 244/12.1 |
| 7,472,863 B2* | 1/2009 | Pak | ................... | A63H 27/14 244/12.5 |
| 7,874,512 B2* | 1/2011 | Xu | ................... | B60F 5/02 244/2 |
| 8,016,226 B1* | 9/2011 | Wood | ................... | B64C 29/0033 244/12.4 |
| 8,616,492 B2* | 12/2013 | Oliver | ................... | B64C 29/0033 244/12.4 |
| 8,646,720 B2* | 2/2014 | Shaw | ................... | B64C 27/20 244/17.23 |
| 8,708,273 B2* | 4/2014 | Oliver | ................... | B64C 29/0033 244/12.4 |
| 8,733,690 B2* | 5/2014 | Bevirt | ................... | B64C 29/0033 244/12.4 |
| 8,800,912 B2* | 8/2014 | Oliver | ................... | B64C 29/0033 244/12.4 |
| 8,827,200 B2* | 9/2014 | Radu | ................... | B60F 5/02 244/2 |
| 9,045,226 B2* | 6/2015 | Piasecki | ................... | G05D 1/102 |
| 9,108,728 B2* | 8/2015 | Shaw | ................... | B64C 27/20 |
| 9,187,174 B2* | 11/2015 | Shaw | ................... | B64C 29/0033 |
| 2003/0062443 A1* | 4/2003 | Wagner | ................... | B64C 3/56 244/12.3 |
| 2003/0080242 A1* | 5/2003 | Kawai | ................... | B64C 11/001 244/12.4 |
| 2004/0026563 A1* | 2/2004 | Moller | ................... | B64C 3/56 244/12.4 |
| 2005/0242231 A1* | 11/2005 | Yoeli | ................... | B60V 1/06 244/23 R |
| 2006/0226281 A1* | 10/2006 | Walton | ................... | B64C 29/0033 244/17.23 |
| 2011/0042507 A1* | 2/2011 | Seiford, Sr. | ................... | B60F 5/02 244/2 |

\* cited by examiner

MULTI-STAGE TILTING AND MULTI-ROTOR FLYING CAR

BACKGROUND OF THE INVENTION (a) Field of the Invention

The present invention relates to a multi-stage tilting and multi-rotor flying car, and more particularly to a multi-stage tilting and multi-rotor flying car, which can take off and land vertically and make a long-distance flight speedily with lift and thrust created by five or more rotors through multi-stage tilting.

(b) Description of the Related Art

A conventional rotary-wing aircraft such as a helicopter is capable of taking off and landing vertically even in a narrow area, but consumes much more energy and is slower than a fixed-wing aircraft while moving horizontally. On the other hand, a general fixed-wing aircraft has advantages of consuming low energy and flying speedily while moving horizontally, but has disadvantage of requiring a relatively long runway.

SUMMARY OF THE INVENTION

Accordingly, the present invention is conceived to solve the forgoing problems, and an aspect of the present invention is to provide a vertical takeoff and landing (VTOL) flying car which can not only vertically take off in a rotary-wing mode using a plurality of rotary wings attached to a ultralight fuselage and wings of an aircraft and then horizontally fly in a fixed-wing mode by changing a thrust direction of some rotors for a horizontal thrust mode through two or more stages, but also taxi with a light automotive-wheel system like a car.

Further, another aspect of the present invention is to provide a flying car which is an aircraft including five or more rotors, fixed-wings and a taxiing system, and is a piloted and automatic unmanned system capable of taking off and landing vertically and making a long-distance flight speedily, thereby selectively functioning as a car or an aircraft as necessary.

In accordance with an aspect of the present invention, there is provided a flying car including a main frame externally shaped like a car or an airplane having a flat surface and a curved surface and internally formed with a grid frame and a skin material; a body mounted at a center of the main frame in consideration of balance; a plurality of rotors mounted to the main frame to face upward, a plurality of wheels mounted to the main frame to face downward, body wings provided at opposite sides of the body; and an automatic driving controller provided in the body and controlling the rotors and the wheels, wherein the plurality of rotors comprises a central front rotor installed in a central front of the main frame, a central rear rotor installed in a central rear, a right front rotor installed in a right rear, a right rear rotor installed in a right rear, a left front rotor installed in a left front, and a left rear rotor installed in a left rear.

In the flying car according to the present invention, under control of the automatic driving controller, all the rotors are driven in a vertical thrust direction and then the central front rotor and the central rear rotor are tilted in a horizontal thrust direction to fly in a middle-low speed mode of a fixed-wing mode. Further, the right front rotor, the right rear rotor, the left front rotor and the left rear rotor are tilted in the horizontal thrust direction to fly in a high-speed mode of the fixed-wing mode. In addition, the right front rotor, the right rear rotor, the left front rotor and the left rear rotor are tilted from the horizontal thrust direction to the vertical thrust direction to convert the high-speed mode into a middle-low speed mode, and then the central front rotor 131 and the central rear rotor 132 are tilted from the horizontal thrust direction into the vertical thrust direction to land vertically.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
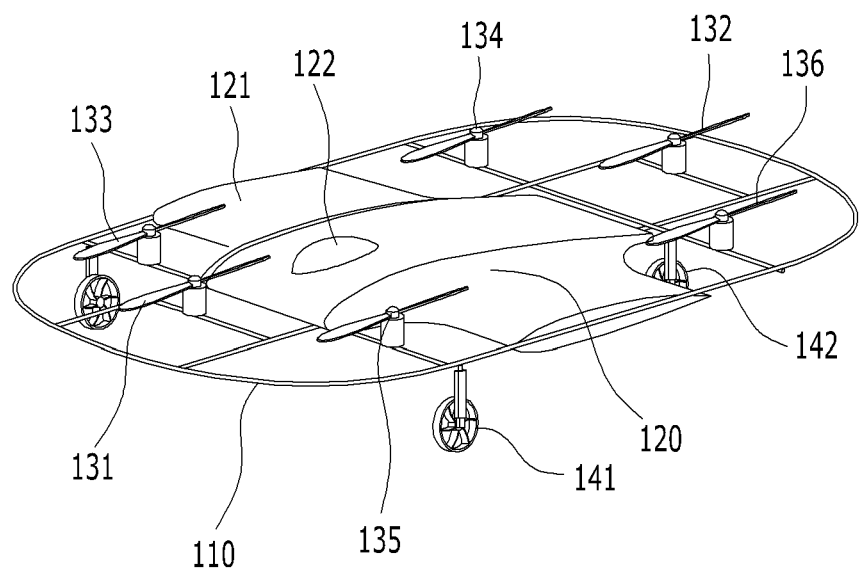
FIG. 1 is a perspective view of a multi-stage tilting and multi-rotor flying car according to an embodiment of the present invention.

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Further, embodiments described in this specification and elements shown in the drawings are nothing but preferable examples, and do not represent the entirety of the present technical idea. Accordingly, it will be appreciated that they may be replaced by various equivalents and modifications on the filing date of the present invention.

FIG. 1 is a perspective view of a multi-stage tilting and multi-rotor flying car according to an embodiment of the present invention.

As shown in FIG. 1, the multi-stage tilting and multi-rotor flying car according to an embodiment of the present invention includes a main frame 110, a body 120, rotors 130 and wheels 140.

Further, the flying car according to an embodiment of the present invention further includes body wings 121 formed at opposite sides of the body 120, and an automatic driving controller 122 provided in the body 120.

The organic relationships of the foregoing elements will be described in more detail. The main frame 110 is a basic frame of the multi-stage tilting and multi-rotor flying car according to an embodiment of the present invention, which is shaped like a rectangle having a rounded edge and is internally partitioned to have a grid structure.

The rounded edge of the main frame 110 is provided to absorb a shock and decrease damage of internal elements such as a propeller when colliding with an external object.

The body 120 is provided at the center of the main frame 110 in consideration of balance of the multi-stage tilting and multi-rotor flying car according to an embodiment of the present invention, and includes body wings 121 at opposite sides to create lift and the automatic driving controller 122 for unmanned automatic driving.

The automatic driving controller 122 may have a space where a pilot can sit for manual control.

The rotors 130 are installed in the main frame 110 to face upward, and include a central front rotor 131 installed in a central front of the main frame 110, a central rear rotor 132 installed in a central rear, a right front rotor 133 installed in a right rear, a right rear rotor 134 installed in a right rear, a left front rotor 135 installed in a left front, and a left rear rotor 136 installed in a left rear.

The rotors may be driven by a motor or an engine as necessary. The motor may be used to drive the rotors at automatic control or in order to minimize noise. Further, the engine may be used to drive the rotors in order to carry a considerable weight of a man.

The wheels 140 are installed in the main frame 110 to face downward, and include front wheels 141 installed in a front of the main frame 110 and rear wheels 142 installed in a rear of the main frame 110.

The wheel 140 may be replaced by a monitoring camera, so that the multi-stage tilting and multi-rotor flying car can have a monitoring function.

The rotors 130 create lift and thrust. In more detail, the rotors 130 are coupled to the main frame 110 by stepping motors, and tilted (or rotated) within a right angle between a vertical thrust direction and a horizontal thrust direction as the stepping motors operate, thereby creating the lift and thrust.

The lift is created when the rotors 130 are driven in the vertical thrust direction, and the thrust is created when the rotors 130 are tilted (or rotated) at a right angle from the vertical thrust direction and driven in the horizontal thrust direction.

If the rotors 130, i.e. the central front rotor 131, the central rear rotor 132, the right front rotor 133, the right rear rotor 134, the left front rotor 135 and the left rear rotor 136 are all driven in the horizontal thrust direction so as to create the thrust, the flying car serves as a car running with the wheels 140. On the other hand, if the foregoing rotors are driven in an upper direction, i.e. the vertical thrust direction so as to create the lift, the flying car serves as an airplane.

Below, combinations of the rotors 130 driven in directions different from one another will be described in more detail.

Figure 2:
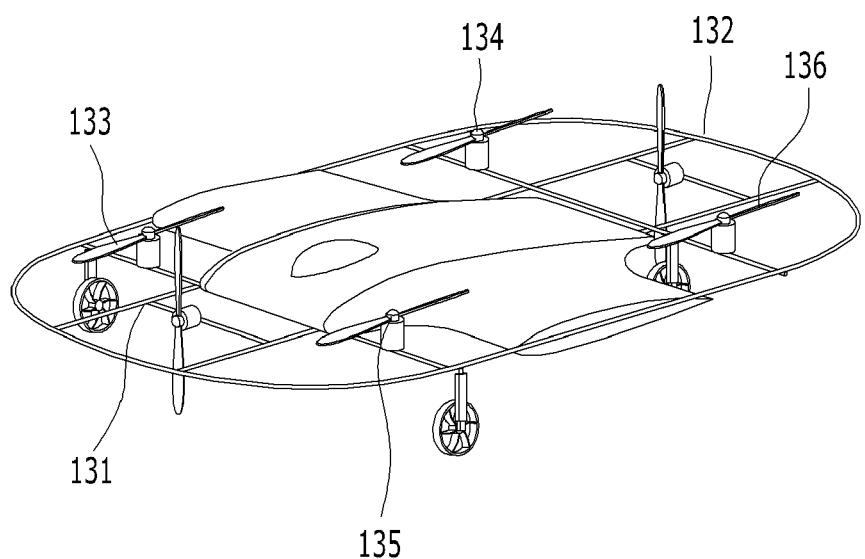
FIG. 2 shows an example that the multi-stage tilting and multi-rotor flying car according to an embodiment of the present invention flies in a middle-low speed mode.

FIG. 2 shows an example that the multi-stage tilting and multi-rotor flying car according to an embodiment of the present invention flies in a middle-low speed mode.

According to an embodiment of the present invention, the multi-stage tilting and multi-rotor flying car 100 is lifted as all the rotors are driven in the vertical thrust direction under automatic control of the automatic driving controller 122 or manual control of a pilot, and then moves forward as the central front rotor 131 and the central rear rotor 132 are tilted in the horizontal thrust direction as shown in FIG. 2, thereby flying in the middle-low speed mode of the fixed-wing mode.

Figure 3:
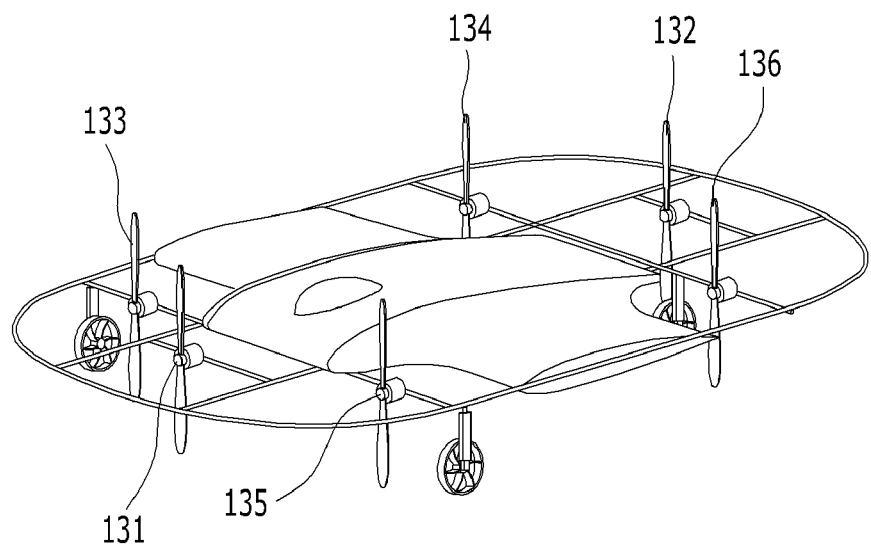
FIG. 3 shows an example that the multi-stage tilting and multi-rotor flying car according to an embodiment of the present invention flies in a high speed mode.

FIG. 3 shows an example that the multi-stage tilting and multi-rotor flying car according to an embodiment of the present invention flies in a high speed mode.

According to an embodiment of the present invention, the multi-stage tilting and multi-rotor flying car 100 is sufficiently lifted as all the rotors are driven in the vertical thrust direction under the automatic control of the automatic driving controller 122 or the manual control of the pilot, and then moves forward as all the rotors are tilted in the horizontal thrust direction as shown in FIG. 3, thereby flying in the high speed mode of the fixed-wing mode.

Further, the flying car 100 converts the high-speed mode into the middle-low speed mode by tilting four symmetric rotors, i.e. the right front rotor 133, the right rear rotor 134, the left front rotor 135 and the left rear rotor 136, from the horizontal thrust direction of FIG. 2 into the vertical thrust direction, and then vertically lands by tilting the other rotors, i.e. the central front rotor 131 and the central rear rotor 132 from the horizontal thrust direction of FIG. 2 into the vertical thrust direction.

Figure 4:
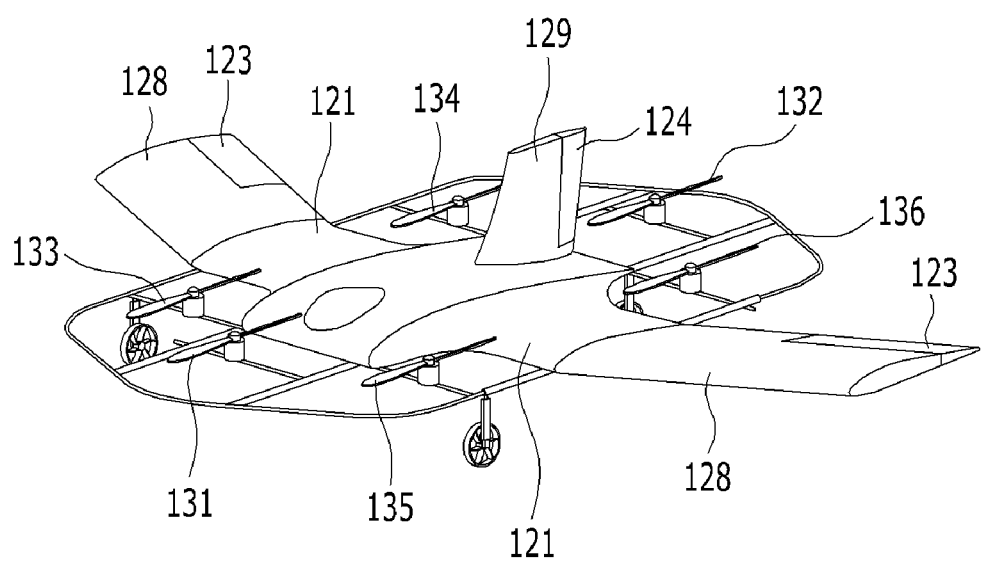
FIG. 4 shows that the multi-stage tilting and multi-rotor flying car according to an embodiment of the present invention is attached with an aileron and a rudder.

FIG. 4 shows that the multi-stage tilting and multi-rotor flying car according to an embodiment of the present invention is attached with an aileron and a rudder. As shown in FIG. 4, the flying car 100 according to this embodiment of the present invention further includes ailerons 123 provided at rear-ends of extended wings 128 respectively extended from the body wings 121, respectively, and a rudder 124 provided at a tail wing 129.

The aileron 123 generates roll-momentum and enables the flying car 100 to have a bank-turn motion, and the rudder 124 improves stability in a yaw direction to thereby enhance controllability in a middle-high speed mode.

Figure 5:
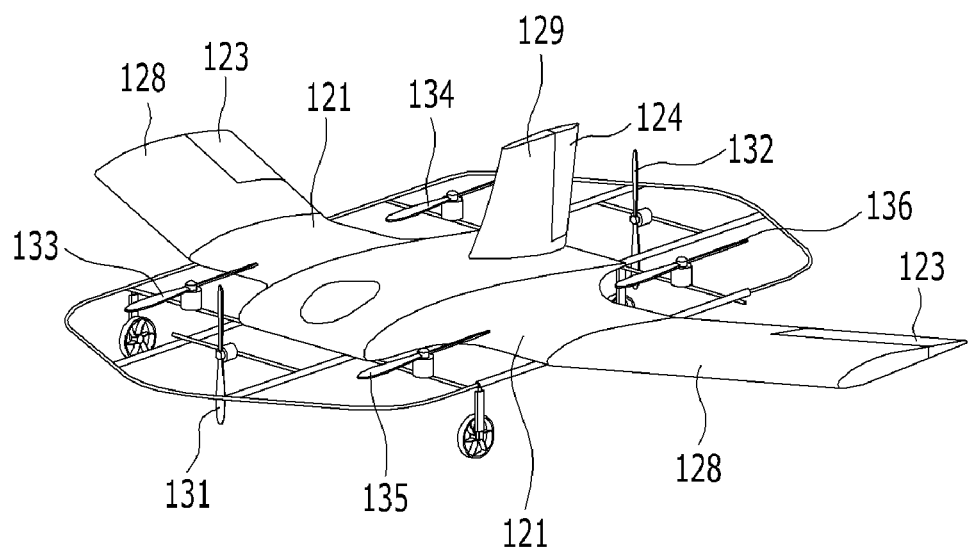
FIG. 5 shows an example that the multi-stage tilting and multi-rotor flying car attached with the aileron and the rudder according to an embodiment of the present invention flies in the middle-low speed mode.

FIG. 5 shows an example that the multi-stage tilting and multi-rotor flying car attached with the aileron and the rudder according to an embodiment of the present invention flies in the middle-low speed mode.

Figure 6:
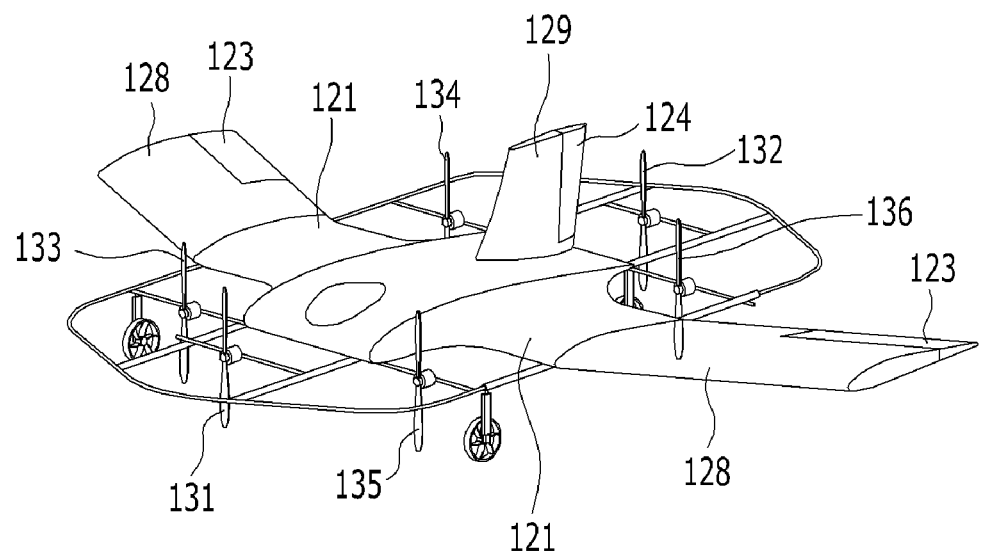
FIG. 6 shows an example that the multi-stage tilting and multi-rotor flying car attached with the aileron and the rudder according to an embodiment of the present invention flies in the high speed mode.

FIG. 6 shows an example that the multi-stage tilting and multi-rotor flying car attached with the aileron and the rudder according to an embodiment of the present invention flies in the high speed mode.

As shown in FIG. 5, and already mentioned while describing the foregoing embodiment where the aileron and the rudder are not attached, the multi-stage tilting and multi-rotor flying car 100 according to the present invention is lifted as all the rotors are driven in the vertical thrust direction under automatic control of the automatic driving controller 122 or manual control of a pilot, and then moves forward as the central front rotor 131 and the central rear rotor 132 are tilted in the horizontal thrust direction, thereby flying in the middle-low speed mode of the fixed-wing mode.

Likewise, as shown in FIG. 6, and already mentioned while describing the foregoing embodiment where the aileron and the rudder are not attached, the multi-stage tilting and multi-rotor flying car 100 is sufficiently lifted as all the rotors are driven in the vertical thrust direction under the automatic control of the automatic driving controller 122 or the manual control of the pilot, and then moves forward as all the rotors are tilted in the horizontal thrust direction, thereby flying in the high speed mode of the fixed-wing mode.

Figure 7:
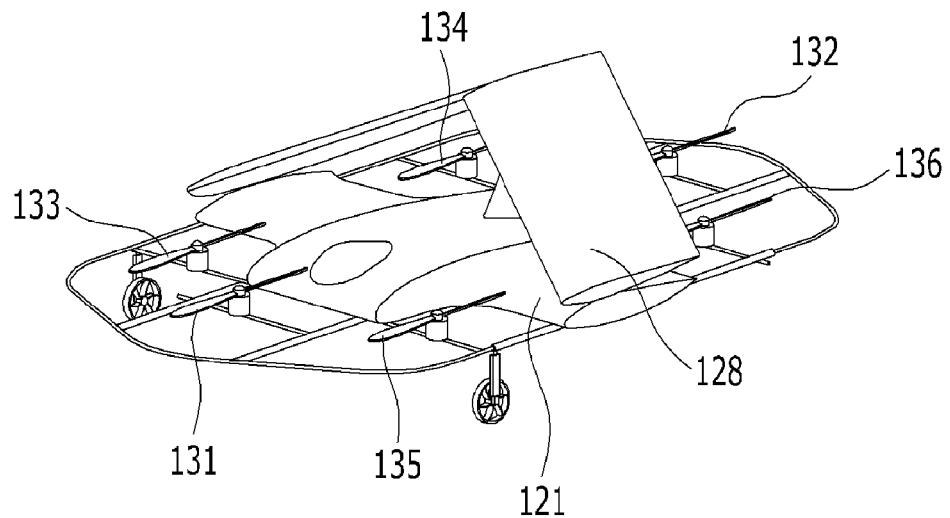
FIG. 7 shows that left and right wings of the multi-stage tilting and multi-rotor flying car according to an embodiment of the present invention are folded.
Figure 11:
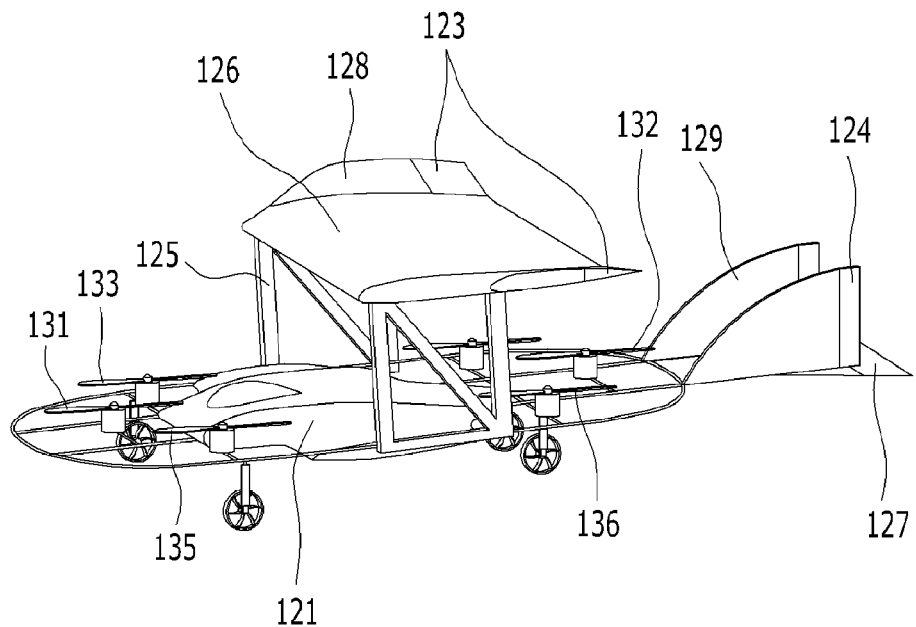

FIGS. 7 and 11 show that the left and right extended-wings 128 of the multi-stage tilting and multi-rotor flying car according to an embodiment of the present invention are folded. While the multi-stage tilting and multi-rotor flying car 100 according to the present invention runs on the road, the extended wings 128 respectively extended left and right from the body wings 121 are folded inward as shown in FIGS. 7 and 11.

FIGS. 8 to 14 are perspective views of a multi-stage tilting and multi-rotor flying car with two pairs of wings.

Figure 8:
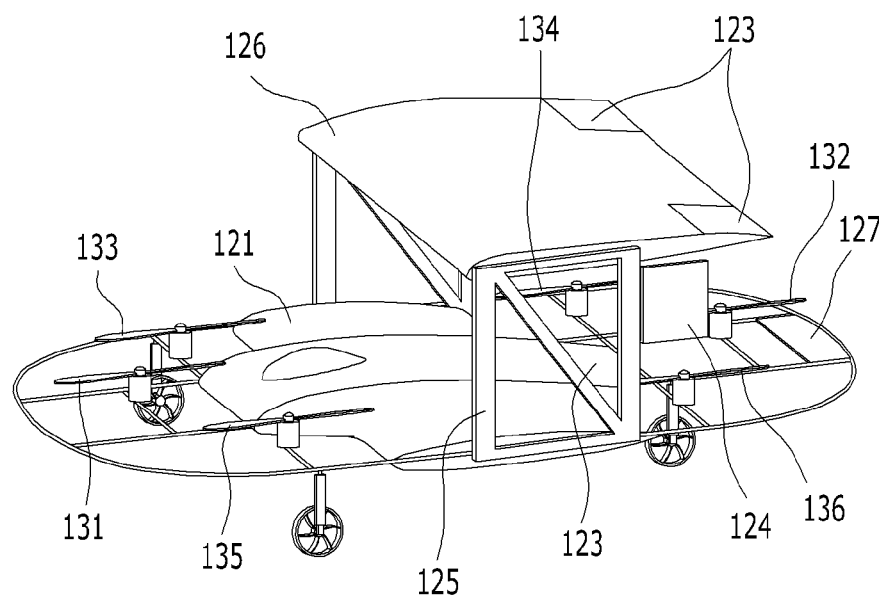
FIGS. 8 to 14 are perspective views of a multi-stage tilting and multi-rotor flying car with two pairs of wings.

As shown in FIG. 8, the multi-stage tilting and multi-rotor flying car with two pairs of wings according to this embodiment of the present invention includes spacing frames 125 respectively standing at the opposite ends of the body wings 121, an upper wing 126 supported by the spacing frames 125, a rudder 124 provided at a rear end of the spacing frame 125 and rotatable within a predetermined angle, ailerons 123 provided at opposite rear-ends of the upper wing 126, and an elevator 127 provided at a rear center of the main frame 110.

Referring to FIG. 11, the multi-stage tilting and multi-rotor flying car with two pairs of wings according to an embodiment of the present invention includes extended wings 128 respectively extended from opposite sides of the upper wing 126, an aileron 123 provided at a rear end of each extended wing 128, and rudders 124 provided at rear ends of a pair of tail wings 129.

As mentioned above, the aileron 123 generates roll-momentum and enables the flying car to fly even at a low speed, and the rudder 124 improves stability in a yaw direction to thereby enhance left- and right-turning performance in a middle-high speed mode.

Further, the elevator 127 also enhances take-off and landing controllability in the middle-high speed mode.

The multi-stage tilting and multi-rotor flying car with two pairs of wings according to this embodiment of the present invention also flies controlling the rotors like the foregoing flying car with the single pair of wings. In more detail, the flying car vertically takes off as all the rotors 130 are driven in the vertical thrust direction as shown in FIG. 8 and FIG. 11, flies at a middle-low speed in the fixed-wing mode as the central front rotor 131 and the central rear rotor 132 are tilted in the horizontal thrust direction as shown in FIG. 9 and FIG. 12, and flies at a high speed as the other rotors, i.e. the right front rotor 133, the right rear rotor 134, the left front rotor 135 and the left rear rotor 136 are tilted in the vertical thrust direction as shown in FIG. 10 and FIG. 13.

Figure 9:
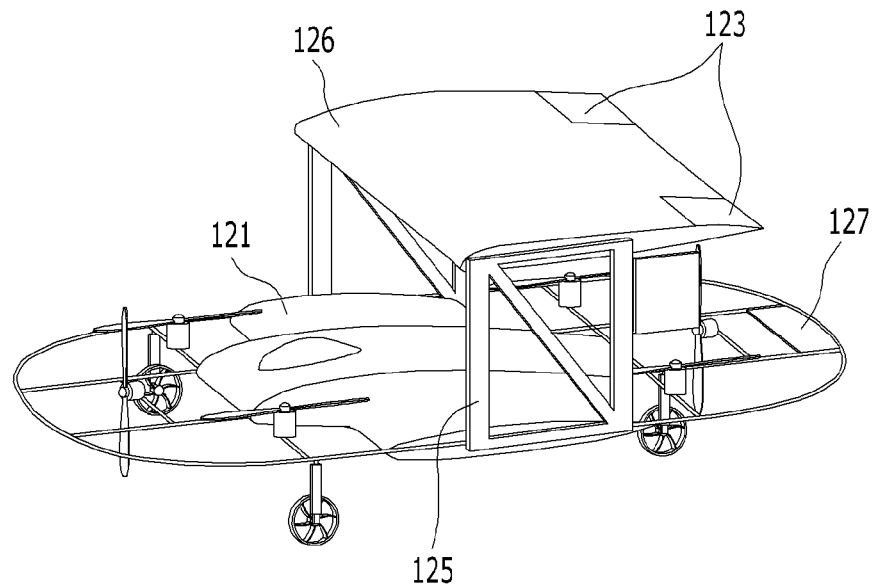
Figure 10:
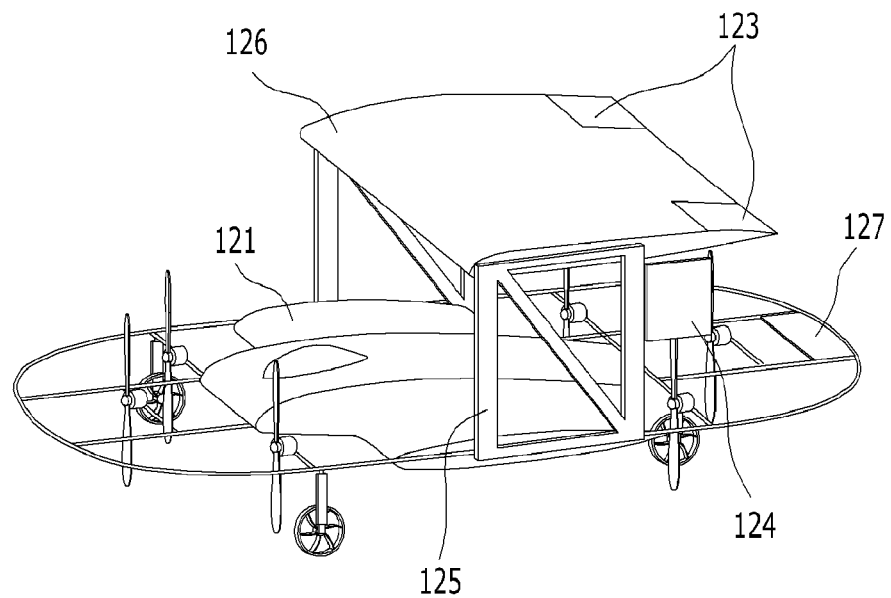
Figure 12:
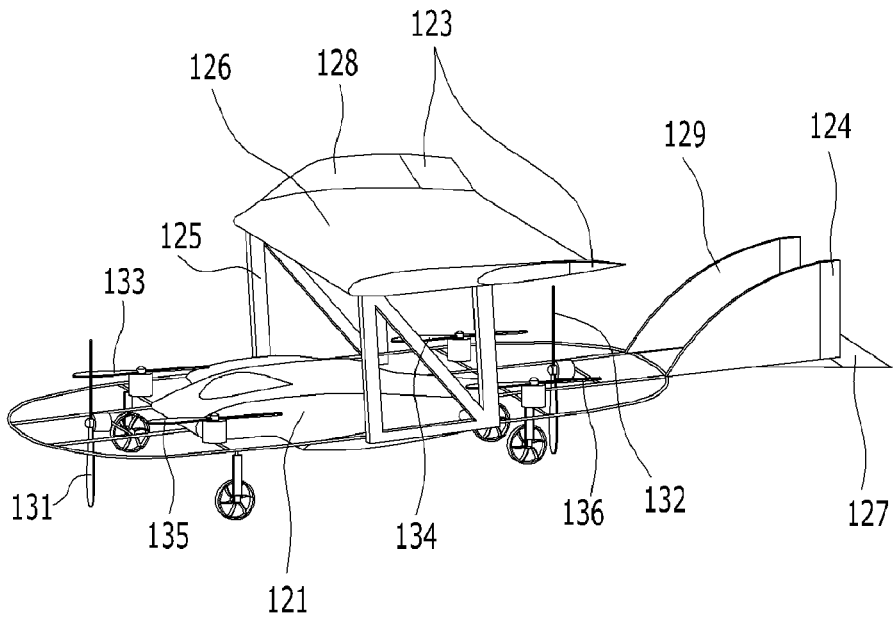
Figure 13:
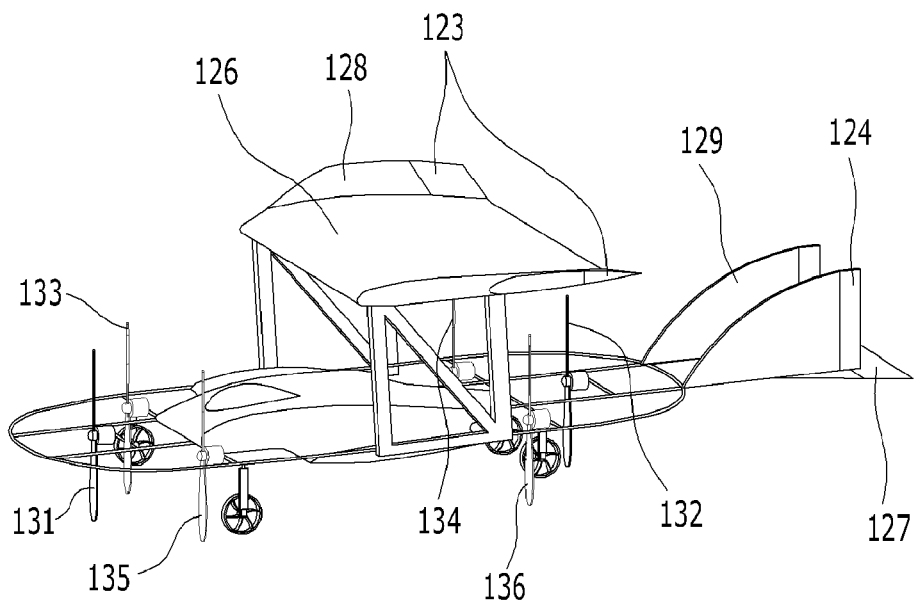
Figure 14:
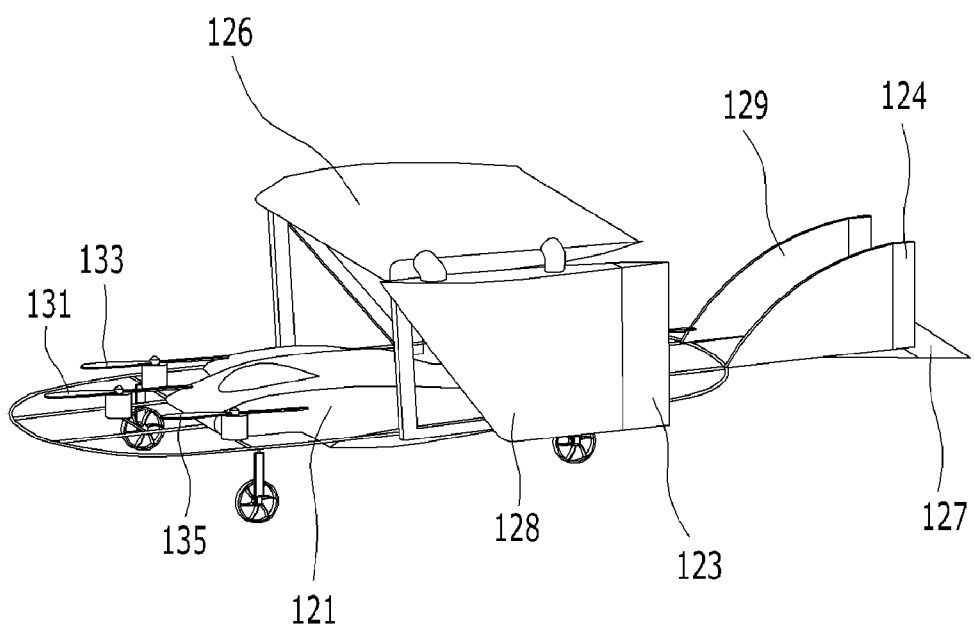

As mentioned in the foregoing embodiment of the flying car with the single pair of wings, the flying car with two pairs of wings converts the high-speed mode into the middle-low speed mode by tilting four symmetric rotors, i.e. the right front rotor 133, the right rear rotor 134, the left front rotor 135 and the left rear rotor 136, from the horizontal thrust direction of FIGS. 9 and 12 into the vertical thrust direction, and then vertically lands by tilting the other rotors, i.e. the central front rotor 131 and the central rear rotor 132 from the horizontal thrust direction into the vertical thrust direction.

According to the present invention, the multi-stage tilting and multi-rotor flying car has effects on spending only the minimum necessary flying time for taking off and landing in a narrow area, and improving flight performance three times higher in flight time and flight speed and five times higher in fight distance than the rotary-wing aircraft such as the helicopter while flying in the fixed-wing mode.

According to the present invention, the multi-stage tilting and multi-rotor flying car is a system with five or more rotors, which has an effect on more improving stability of a transition flight, since the transition flight is stepwise performed between the rotary-wing and the fixed-wing, than the conventional aircraft with two rotors to perform the transition flight between the rotary wing and the fixed-wing (for example, Boeing's Osprey, and KARI's a smart unmanned air vehicle).

According to the present invention, the multi-stage tilting and multi-rotor flying car is a new automatic-flight piloted/unmanned flying car with five or more rotors, which has not been attempted, and serves as both the piloted/unmanned car and airplane.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A multi-stage tilting and multi-rotor flying car comprising:
    a main frame externally shaped like a rectangle and internally partitioned to have a grid structure;
    a body mounted at a center of the main frame in consideration of balance;
    a plurality of rotors mounted to the main frame to face upward;
    a plurality of wheels mounted to the main frame to face downward;
    body wings provided at opposite sides of the body; and
    an automatic driving controller provided in the body and controlling the rotors and the wheels,
    wherein a portion of the main frame extends in front of the body and a portion of the main frame extends behind the body,
    wherein the plurality of rotors includes a central front rotor located along a center of the main frame in front of the body, and
    wherein the central front rotor is rotatable from an upward-facing position to a frontward-facing position substantially perpendicular to the upward-facing position.

2. The multi-stage tilting and multi-rotor flying car according to claim 1, wherein the plurality of rotors further comprises a central rear rotor installed in a central rear portion of the main frame, a right front rotor installed in a right front portion of the main frame, a right rear rotor installed in a right rear portion of the main frame, a left front rotor installed in a left front portion of the main frame, and a left rear rotor installed in a left rear portion of the main frame.

3. The multi-stage tilting and multi-rotor flying car according to claim 2, wherein all the rotors are configured to be driven in a vertical thrust direction, and the central front rotor and the central rear rotor are further configured to tilt to a horizontal thrust direction, under control of the automatic driving controller, to fly in a middle-low speed mode of a fixed-wing mode.

4. The multi-stage tilting and multi-rotor flying car according to claim 3, wherein the right front rotor, the right rear rotor, the left front rotor and the left rear rotor are configured to tilt to the horizontal thrust direction, under control of the automatic driving controller, such that a configuration in which each of the center front rotor, central rear rotor, right front rotor, right rear rotor, left front rotor, and left rear rotor are tilted to a horizontal thrust direction defines a high-speed mode of the fixed-wing mode.

5. The multi-stage tilting and multi-rotor flying car according to claim 4, wherein, under control of the automatic driving controller, the right front rotor, the right rear rotor, the left front rotor and the left rear rotor are tilted from the horizontal thrust direction to the vertical thrust direction to convert the high-speed mode into a middle-low speed mode, and then the central front rotor and the central rear rotor are tilted from the horizontal thrust direction into the vertical thrust direction to land vertically.

6. The multi-stage tilting and multi-rotor flying car according to claim 1, further comprising ailerons mounted to extended wings respectively extended from the body wings, and a rudder mounted to a tail wing.

7. The multi-stage tilting and multi-rotor flying car according to claim 6, wherein the extended wing is foldable.

8. The multi-stage tilting and multi-rotor flying car according to claim 1, further comprising:
   a spacing frame respectively standing at opposite sides of the body wings;
   an upper wing supported by the spacing frames to be spaced apart at a predetermined distance from and in parallel with the body wings;
   a rudder provided at a rear end of the spacing frame and rotatable within a predetermined angle;
   ailerons provided at opposite rear-ends of the upper wing; and
   an elevator provided at a rear center of the main frame,
   wherein the spacing frame, the upper wing, the rudder, the ailerons and the elevator constitute a structure of two pairs of wings.

9. The multi-stage tilting and multi-rotor flying car according to claim 1, wherein the body is configured to accommodate a pilot to control the flying car.

10. The multi-stage tilting and multi-rotor flying car according to claim 1, wherein the main frame comprises a rounded edge to absorb a shock when colliding with an external object.

11. The multi-stage tilting and multi-rotor flying car according to claim 1, wherein the rotor is driven by a motor or an engine.

12. The multi-stage tilting and multi-rotor flying car according to claim 1, further comprising a camera for a monitoring function.

13. The multi-stage tilting and multi-rotor flying car according to claim 2, further comprising ailerons mounted to extended wings respectively extended from the body wings, and a rudder mounted to a tail wing.

14. The multi-stage tilting and multi-rotor flying car according to claim 3, further comprising ailerons mounted to extended wings respectively extended from the body wings, and a rudder mounted to a tail wing.

15. The multi-stage tilting and multi-rotor flying car according to claim 4, further comprising ailerons mounted to extended wings respectively extended from the body wings, and a rudder mounted to a tail wing.

16. The multi-stage tilting and multi-rotor flying car according to claim 5, further comprising ailerons mounted to extended wings respectively extended from the body wings, and a rudder mounted to a tail wing.

17. The multi-stage tilting and multi-rotor flying car according to claim 2, further comprising:
   a spacing frame respectively standing at opposite sides of the body wings;
   an upper wing supported by the spacing frames to be spaced apart at a predetermined distance from and in parallel with the body wings;
   a rudder provided at a rear end of the spacing frame and rotatable within a predetermined angle;
   ailerons provided at opposite rear-ends of the upper wing; and
   an elevator provided at a rear center of the main frame,
   wherein the spacing frame, the upper wing, the rudder, the ailerons and the elevator constitute a structure of two pairs of wings.

18. The multi-stage tilting and multi-rotor flying car according to claim 3, further comprising:
   a spacing frame respectively standing at opposite sides of the body wings;
   an upper wing supported by the spacing frames to be spaced apart at a predetermined distance from and in parallel with the body wings;
   a rudder provided at a rear end of the spacing frame and rotatable within a predetermined angle;
   ailerons provided at opposite rear-ends of the upper wing; and
   an elevator provided at a rear center of the main frame,
   wherein the spacing frame, the upper wing, the rudder, the ailerons and the elevator constitute a structure of two pairs of wings.

19. The multi-stage tilting and multi-rotor flying car according to claim 4, further comprising:
   a spacing frame respectively standing at opposite sides of the body wings;
   an upper wing supported by the spacing frames to be spaced apart at a predetermined distance from and in parallel with the body wings;
   a rudder provided at a rear end of the spacing frame and rotatable within a predetermined angle;
   ailerons provided at opposite rear-ends of the upper wing; and
   an elevator provided at a rear center of the main frame,
   wherein the spacing frame, the upper wing, the rudder, the ailerons and the elevator constitute a structure of two pairs of wings.

20. The multi-stage tilting and multi-rotor flying car according to claim 5, further comprising:
   a spacing frame respectively standing at opposite sides of the body wings;
   an upper wing supported by the spacing frames to be spaced apart at a predetermined distance from and in parallel with the body wings;
   a rudder provided at a rear end of the spacing frame and rotatable within a predetermined angle;
   ailerons provided at opposite rear-ends of the upper wing; and
   an elevator provided at a rear center of the main frame,
   wherein the spacing frame, the upper wing, the rudder, the ailerons and the elevator constitute a structure of two pairs of wings.

* * * * *